Jan. 11, 1944.     A. MESSERLI     2,338,954
SHAKING CONVEYER
Filed July 17, 1942
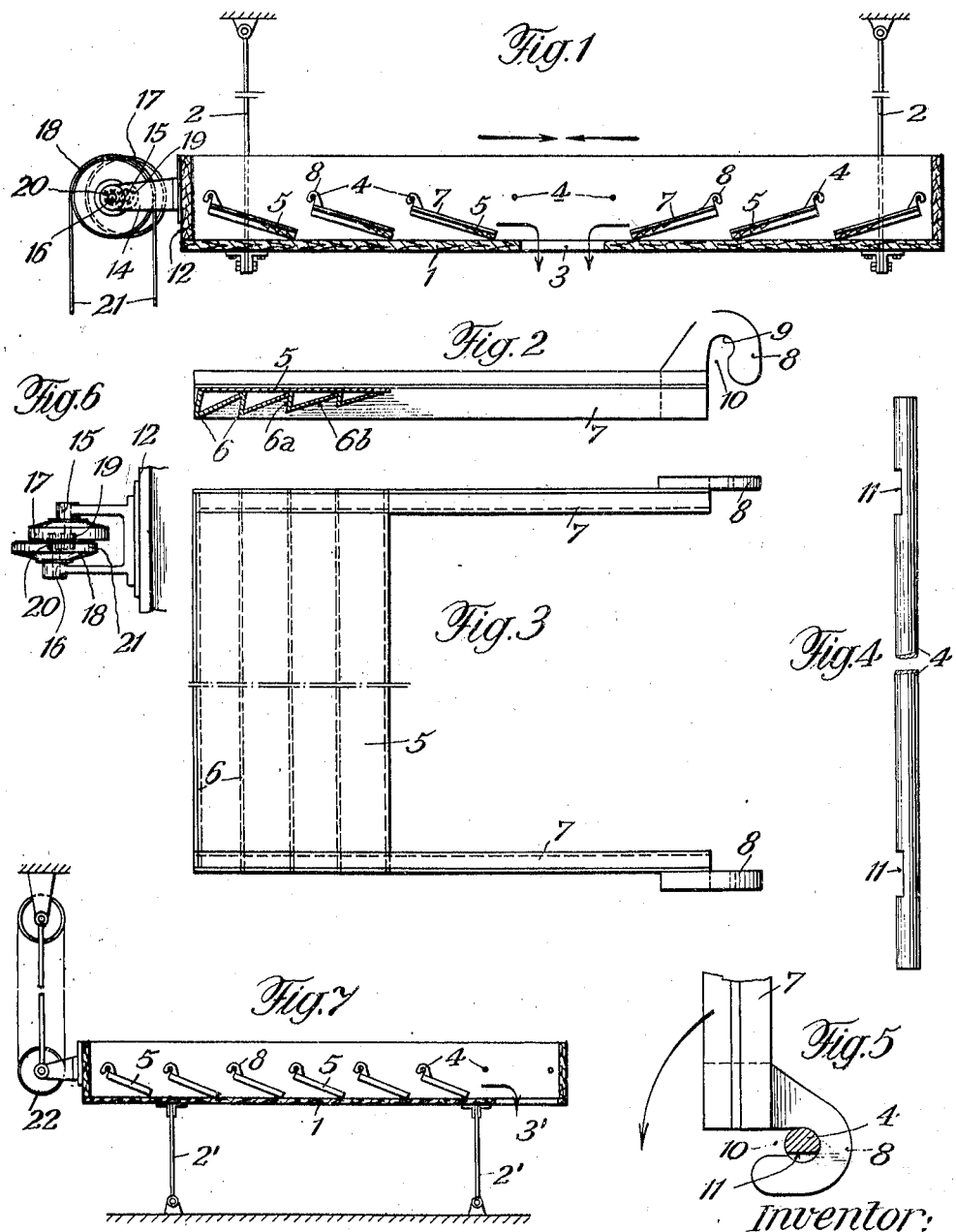
Inventor:
Alexander Messerli,
by Sommers & Young
Attorneys Patented Jan. 11, 1944

2,338,954

UNITED STATES PATENT OFFICE 2,338,954

SHAKING CONVEYER

Alexander Messerli, Niederuzwil, Switzerland, assignor to Gebrüder Bühler, Uzwil, Switzerland Application July 17, 1942, Serial No. 451,327
In Switzerland February 20, 1941

5 Claims. (Cl. 198—220)

This invention relates to shaking conveyers of the kind which can be used for example in middling purifiers.

Known constructions of shaking conveyers for middling purifiers either comprise a conveyer trough having an inclined bottom, or a conveyer trough which is so suspended as to be inclined when in operating position, in order to advance the material towards the discharge opening of the trough upon rapid reciprocating motion thereof. The arrangement of such shaking conveyers however results in certain disadvantages. When the bottom of the trough is inclined towards the discharge, it is necessary that the different discharging places be already known when the machine of which the conveyer forms a part is under construction, because otherwise the machine could be finished only at the place where it is intended to be used. In the second case, when the shaking trough is suspended to be inclined, there exists the disadvantage that the material to be conveyed can be transported in one direction only.

The object of the present invention is the provision of a shaking conveyer comprising a conveyer trough having push members suspended therein to cooperate with the material to be conveyed and which can be so arranged that the material in the horizontally disposed trough can be moved in one or the other direction, according to requirements, when the trough is subjected to vibratory motion. In this case it is possible to manufacture machines equipped with this shaking conveyer in series without it being necessary to know beforehand where the discharges are situated, the discharge openings being made in the trough according to requirements once the machine is mounted at its place of destination and the push members are suspended in the trough so as to make the material move in the desired direction towards the discharge openings.

The accompanying drawing illustrates by way of example two embodiments of the invention.

Figure 1 is a longitudinal section of a shaking conveyer according to the invention, Figure 2 is a longitudinal section of a push member and Figure 3 a plan view thereof.

Figure 4 shows the suspension bar of the push member.

Figure 5 shows the manner in which the push member is suspended on the bar.

Figure 6 is a detail view of the drive mechanism.

Figure 7 is a longitudinal section of a modified form of a conveyer according to the invention.

The shaking conveyer represented in Figs. 1 to 5 comprises a conveyer trough 1 which is carried by suspension members 2 and provided with a discharge opening 3 in the middle portion of its bottom. At opposite longitudinal walls of the trough 1 a number of bars 4 extending transversely of the trough are fixed with their ends. Push members 5 are suspended on the bars 4; the lower surface of these members is provided with a series of projections 6 having the shape of ratchet teeth and which are formed by substantially vertically and transversely extending pushing surfaces 6a facing in the direction of flow of the material, and by inclined connecting surfaces 6b extending transversely between successive pushing surfaces. Each push member 6 is provided with two suspension arms 7, to the ends of which hooks 8 are fixed. The circular hook opening 9 corresponds to the diameter of the suspension bars 4, while the entrance 10 to the opening 9 is slightly narrower than the diameter of the opening. At two places corresponding to the distance between the two hooks 8 of a push member, the bar 4 is provided with two recessed portions formed by flat surfaces 11 serving for the suspension of the hooks 8 of the push members. The flat surfaces 11 define portions of reduced diameter of the bars 4 and are situated on the lower side of the bar 4 when the bar is fixed in the trough 1; as shown in Fig. 5, for placing the hooks 8 astride the bar 4, the push member 5 is held with its arms 7 in vertical position and with the hooks 8 situated at the lower end. In this position of the hook the narrow entrance 10 to the hook opening 9 can be moved past the flattened portion 11 of the bar 4 to insert the bar into the hook opening 9, whereafter the push member is turned in the direction of the arrow into operating position as indicated in Fig. 1; in this position the hooks can no longer be removed from the bar 4 and accordingly the push member is prevented from falling off the suspension bars owing to vibration during operation of the conveyer trough.

In order to impart vibratory motion to the conveyer trough, the transverse wall 12 of the trough is connected to a vibrator of known design. The wall 12 carries two bearings 13 and 14 in which are mounted shafts 15 and 16 carrying each an eccentrically weighted disc 17 and 18. The inner ends of the shafts carry pinions 19 and 20, respectively, which are in mesh with each other. The disc 18 serves as pulley and is driven by a belt 21 connected to a motor. When the motor is started and the belt turns the disc 18, the two meshing pinions roll one around the other and impart by the intermediary of the shafts 15 and 16 rapid vibratory motion to the trough 1.

The operation of the described shaking conveyer is as follows: When the trough moving rapidly to-and-fro is charged with granular material to be conveyed the push members 5 are raised with their free ends to the height of the material in the trough, so that the members 5 float on top of the material. However, the level of the material in the trough must be limited to such a height that the center of gravity of the floating push members 5 is situated below the points of suspension of the members, accordingly, below the transverse bars 4. The weight of the push members acts on the material and slightly urges the material towards the bottom of the trough. When the oscillating trough moves towards the left hand side in Fig. 1, the material in the right half of the trough is forced to participate in the movement of the trough towards the left, since the pushing surfaces 6a of the projections 6 of the push members cause an additional pressure to be exerted by the push member downwardly on the material, and the material is taken along with the trough owing to increased friction on the bottom of the trough and to the action of the pushing surfaces 6a. The push members 5 situated in the left side half of the trough do not act with their surfaces 6a on the material when the trough swings towards the left side, but the pressure of these push members on the material is almost balanced by the pressure of the material acting on the inclined surfaces 6b, and owing to its inertia the material in the left half of the trough remains stationary, while the trough and the push members move towards the left side relatively to the material. The inclined surfaces 6b slide over the surface of the material and accordingly this latter moves relatively to the trough towards the discharge opening 3. When the trough oscillates towards the right hand side, the action of the push members 5 is reversed; in the right half of the trough the material, relatively speaking, remains stationary and the push members slide over the material which accordingly moves relatively to the trough towards the discharge opening 3, while in the left half of the trough the pushing surfaces 6a of the push members 5 cause the material to participate in the movement of the trough. In this manner the material to be conveyed is intermittently moved towards the discharge opening 3, and the free end of the push members provided with the projections 6 and floating on the surface of the material slightly moves up and down according to the cadence of the oscillating movement of the trough during operation thereof.

In the example represented in Fig. 7, the trough 1 is provided at one of its ends with the discharge opening 3' and the push members 5, suspended by their hooks 8 on the transverse rods 4, have their free ends all directed towards the same side, that is towards the discharge opening. The trough 1 is supported on pivoted bars 2', and a vibration imparting mechanism 22 similar to that shown in Figs. 1 and 7 is connected to a transverse wall of the trough.

The machines, for example middling purifiers, which are provided with the described shaking conveyer, can be made in series in identical execution and the material to be conveyed can be transported in one or the other direction, or towards the middle of the trough, as shown in Figs. 1 or 7, by correspondingly suspending the push members 5 so that their free ends are directed towards the discharge opening. In this manner the discharge opening can be made at the place where the conveyer is used in accordance with actual requirements, and the push members will be suspended to correspond to the desired direction of conveying the material.

Although I have shown preferred embodiments of the present invention, it should be well understood that I do not wish to be limited to the particular arrangements disclosed, and that changes may be made in the arrangement, disposition and form of the parts without departing from the principle of the invention as comprehended within the scope of the appended claims.

I claim:

1. A shaking conveyer comprising a conveyer trough, drive mechanism adapted to impart a reciprocating motion to said conveyer trough, a series of push members suspended by one end within said trough and extending transversely of the trough, the other end of the push members being adapted to float on the material to be conveyed by the trough, and means projecting from the underneath sides of said push members to act on the material upon movement of the trough in one direction, whereby pressure is exerted on the material for obliging the material to participate in the movement of the trough, while upon movement of the trough in the other direction the material in the trough is relieved from the weight of the push members, whereby the material owing to inertia moves relatively to the trough.

2. A shaking conveyer comprising a conveyer trough, drive mechanism adapted to impart a reciprocating motion to the conveyer trough, said conveyer trough being provided with a discharge opening for the conveyed material, a series of push members pivotally suspended by one end within the trough and extending transversely of the trough, the other end of the push members being directed towards said discharge opening and being floatingly supported by the material to be conveyed, and projections on said push members extending toward the material adapted upon movement of the trough in one direction to increase the pressure exerted by the push members on the material in the trough for obliging the material to participate in the movement of the trough, while upon movement of the trough in the other direction the material in the trough is relieved from pressure exerted by the push members, whereby the material owing to inertia moves relatively to the trough towards said discharge opening.

3. A shaking conveyer comprising a conveyer trough, driving mechanism for imparting a reciprocating motion to the conveyer trough, push members arranged transversely of the trough and suspended by one end within the trough, the other end of the push member being floatingly supported by the material to be conveyed in the trough, the surface of the push members in contact with the material being provided with a plurality of projections forming a series of successively arranged pushing surfaces extending transversely of the trough and facing in the direction in which the material is to be moved, said pushing surfaces acting on the material in the trough when the trough is moving in one direction to exert a pressure on the material and forcing the material to participate in the movement of the trough, and connecting surfaces extending between successive pushing surfaces, said connecting surfaces being inclined relative to the plane of movement of the material in the trough and acting, upon movement of the trough in opposite direction, to relieve the material from the weight of the push members whereby the material owing to inertia moves relatively to the trough.

4. A shaking conveyer comprising a conveyer trough, drive mechanism adapted to impart a reciprocating motion to the conveyer trough, a series of transversely extending suspension bars carried by the conveyer trough, push members suspended by one end on said suspension bars and having the other end floatingly supported by the material to be conveyed in the trough, suspension hooks carried by the push members, said hooks having suspension bar receiving openings corresponding to the diameter of the suspension bars and a passageway of reduced diameter giving access to said openings, the suspension bars being provided with recesses defining portions of reduced diameter adapted to cooperate with said passageway of the suspension hooks to permit engagement of the hooks on the bars by passing said portions of reduced diameter of the bars through said passageway of the hook when the push member is held in a position angularly displaced from the position of operation, whereby the push member is locked on the suspension bar after having been rocked into operating position.

5. A shaking conveyer comprising a conveyer trough, drive mechanism adapted to impart a reciprocating motion to the conveyer trough, said conveyer trough being provided with a discharge opening for the conveyed material, a series of push members pivotally suspended by one end within the trough and extending transversely of the trough, the other end of the push members being directed towards the discharge opening and floating on the material to be conveyed, the point of suspension of the push member being situated on a higher level than the center of gravity of the push member in its position of operation, and means projecting from the surface of the push member into contact with the material to be conveyed acting to increase the pressure of the push member on the material upon movement of the trough in one direction and to relieve the material from the pressure of the push member upon movement of the trough in opposite direction.

ALEXANDER MESSERLI.